United States Patent [19]

Doyle

[11] Patent Number: 5,629,383
[45] Date of Patent: May 13, 1997

[54] DEPARTICULATION

[75] Inventor: Thomas R. Doyle, Leominster, Mass.

[73] Assignee: Novacor Chemicals (Internatioanal) SA, Villars-Sur-Glane, Switzerland

[21] Appl. No.: 644,457

[22] Filed: May 10, 1996

[51] Int. Cl.$^6$ .................................. C08F 279/02
[52] U.S. Cl. .................. 525/316; 525/285; 525/309; 525/310; 525/53
[58] Field of Search .................. 525/310, 309, 525/316, 53, 285

[56] References Cited

U.S. PATENT DOCUMENTS

| | | | |
|---|---|---|---|
| 2,694,692 | 11/1954 | Amos | 525/300 |
| 3,658,946 | 4/1972 | Bronstert | 525/53 |
| 3,660,535 | 5/1972 | Finch | 525/53 |
| 3,883,616 | 5/1975 | Hozumi et al. | 525/243 |
| 3,903,202 | 9/1975 | Carter | 525/53 |
| 4,007,234 | 2/1977 | Schuddemage et al. | 525/243 |
| 4,233,418 | 11/1980 | Lingier et al. | 525/243 |
| 4,308,354 | 12/1981 | Jung et al. | 525/84 |
| 4,857,587 | 8/1989 | Sosa | 525/53 |
| 4,861,827 | 8/1989 | Sosa | 525/54 |
| 4,985,208 | 1/1991 | Sugawara | 422/135 |
| 5,210,132 | 5/1993 | Matsubara | 525/53 |
| 5,274,029 | 12/1993 | Kelly et al. | 525/53 |
| 5,278,253 | 1/1994 | Baumgartner et al. | 525/316 |

OTHER PUBLICATIONS

Kirk–Othmer, Encyclopedia of Chemical Technology 1983, vol. 21, pp. 823–826.

*Primary Examiner*—Irina S. Zemel
*Attorney, Agent, or Firm*—Kenneth H. Johnson

[57] ABSTRACT

A stable partially polymerized syrup comprising dispersed rubber-like composite particles in a resin phase may be converted to a metastable syrup in which the rubber-like composite and resin phases are co-continuous by subjecting the stable syrup to high shear under pressure.

10 Claims, 3 Drawing Sheets

DEPARTICULATION

FIELD OF THE INVENTION

The present invention relates to a process to convert a stable particulated syrup comprising a continuous resin phase and a discontinuous rubber-like composite phase to a (post inversion) metastable syrup typically comprising co-continuous resin- and rubber-like composite phases.

Still later in the process the metastable co-continuous resin and rubber-like composite phase may be particulated to form a stable dispersed rubber-like composite phase in a syrup comprising a continuous resin phase.

BACKGROUND OF THE INVENTION

The field of the manufacture of impact modified plastics is relatively old and the current industrial processes for their manufacture are fairly well known. According to conventional technology typically a solution of rubber, typically comprising 1 to about 20, preferably from 3 to 12 weight %, most preferably 4 to 10 weight % of rubber dissolved in one or more monomers is polymerized in a first stage reactor under mechanical agitation. Whether the polymerization occurs in a batch, stirred plug flow or continuous stirred tank reactors, almost all prior art and disclosures clearly teach that the particle size, particle size distribution and morphology of the dispersed rubber-like composite phase of the final product is largely determined during particulation in the early part of the process.

Particulation is the generic term used to describe the formation of the dispersed rubber-like composite phase regardless of its mechanism.

In the production of high impact polystyrene in a batch process or in a stirred plug flow reactor, the rubber-like composite phase is the continuous phase and the resin phase (monomer/resulting polymer phase) is dispersed. Typically, in conventional processes, as the polymerization proceeds in time with a batch reactor or in space with a stirred plug flow reactor, at some point between 5 and 20% conversion the system undergoes particulation by phase inversion under the application of a shear field generated by mechanical agitation. That is the rubber-like composite phase becomes the dispersed phase and the resin phase becomes the continuous phase. This does not happen instantaneously but occurs over a considerable period of time or space, typically from 20 to 50 minutes or reactor space which produces 2 to 8% conversion. That is the rubber-like composite phase and resin phase become co-continuous for a period of time or space before the particulation process is complete.

The ternary phase diagram of the styrene-polystyrene-polybutadiene system has been well studied and is well known. For example, the phase diagram and what happens during the polymerization of high impact polystyrene is discussed in Kirk-Othmer, *Encyclopedia of Chemical Technology*, published in 1983, Volume 21, pages 823 through 826.

In the production of high impact polystyrene in a continuous stirred tank reactor (CSTR) the rubber phase is particulated by the mechanism of dispersion. That is the rubber or rubber-like composite phase is dispersed in a CSTR that is operated with a continuous resin phase.

The distinction between rubber phase and rubber-like composite phase used in this document is as follows: The rubber phase is simply rubber dissolved in one or more monomers, while the rubber-like composite phase refers to rubber that has been modified by reaction with one or more monomers during polymerization. That is during polymerization polymer chains containing one or more monomers is grafted to the rubber molecules. In addition to graft copolymer, the rubber-like composite phase may contain occluded polymer. Occluded polymer is not grafted to the rubber molecules and resides within the rubber-like composite phase.

According to conventional wisdom the polymer chemist has a limited degree of freedom concerning the process of particulation in the manufacture of impact modified thermoplastic resins. That is particulation is limited to the region of phase inversion in a batch process and stirred plug flow reactors or at the point of dispersion in CSTR's. It is impossible to precisely control particulation in batch or plug flow reactors since it occurs over a period of time or a region of reactor space. In a CSTR particulation by dispersion occurs almost instantaneously, but due to the dynamics of the system the time the particles spend in the reactor is described by an exponential distribution. That is some particles exit the reactor shortly after forming while others may reside much longer. Furthermore, in a CSTR it is difficult, if not impossible to ensure that each unit volume of the reactants under goes the same or comparable shear history. As a result the particle size distribution of the dispersed rubber-like composite phase is typically broadest when formed in a CSTR.

Particle size, particle size distribution and morphology contribute to a number of properties of the product including impact resistance, gloss and translucency. Unfortunately, generally to maximize one property tends to reduce one or more of the other properties of the final polymer. There have been some attempts to overcome these deficiencies by blending resins having different particle sizes. Such an approach is expensive as it requires passing a melt blend of the resins through an extruder. Additionally, the properties of a blend may be lower than that expected from the weighted numerical average of the properties of each of the components in the blend.

The following is representative of the state of the art in the polymerization of impact modified the thermoplastics. Almost all techniques largely determine the final particle size of the rubber-like composite phase at the point of phase inversion or dispersion.

U.S. Pat. No. 2,694,692 issued Nov. 16, 1954, assigned to The Dow Chemical Company discloses the desirability and criticality of agitation during the early stages of polymerization of impact modified thermoplastic polymers.

U.S. Pat. No. 3,658,946 issued Apr. 25, 1972, assigned to Badische Aniline-& Soda-Fabrik Aktiengesellschaft (BASF) discloses particle size and distribution of impact modified thermoplastics may be controlled by varying the stirrer speed or shear during the early part of the reaction.

U.S. Pat. No. 3,660,535 issued May 2, 1972 assigned to the Dow Chemical Company discloses stirring or mechanical agitation during the initial stages of polymerization to create the required particle size distribution in the polymerization of an impact modified thermoplastic.

U.S. Pat. No. 3,903,202 issued Sep. 2, 1975 assigned to Monsanto Company teaches dispersing under mechanical agitation a monomer syrup containing rubber into a partially polymerized monomer, during the early stages of polymerization to create the required dispersion of impact modifier throughout the resin phase.

U.S. Pat. Nos. 4,857,587 and 4,861,827 issued Aug. 15 and 29, 1989 respectively, assigned to Fina Technology Inc. discloses the use of mechanical agitation during the early stages of the polymerization of an impact modified thermoplastic to create the required dispersion of rubber throughout the continuous resin phase.

There are three patents which Applicants are aware of which state the control of shear is important in the process.

Canadian Patent 832,523 issued Jan. 20, 1970 to Shell Internationale Research Maatschappij N.V., teaches HIPS containing a bimodal particle size distribution. The HIPS comprises from 70 to 99 weight % of polystyrene and from 1 to 30 weight % of a dispersed rubber phase having a particle size distribution so that from 70 to 97% of the particles have a diameter from 1 to 3 microns and from 30 to 3% of the particles have a diameter from 5 to 25 microns.

The Shell patent teaches controlling agitation or shear during the early stages of polymerization to obtain the required particle distribution. The Shell patent teaches using the shear of a conventional process.

It is interesting to note that while the Shell patent also clearly contemplates blending impact modified polystyrenes (page 4, lines 10–15) and interpolymerizing styrene monomer containing two distinct types of rubber to obtain the required particle size distribution, it does not teach or disclose blending syrups having different particle size distributions and completing the polymerization to directly yield a product having a bi-modal particle size distribution.

U.S. Pat. No. 4,007,234, assigned to Hoechst A. G., issued Feb. 8, 1977 discloses a process for controlling the particle size distribution in high impact styrene copolymers modified with ethylene-propylene rubbers. The polymer prepared using a mass/mass or mass/suspension process with high shear in the prepolymerizer. The resulting polymer is then subjected to a two stage shearing action. A catalyst is introduced into the polymer prior to or during the second shearing to crosslink the rubber particles and to maintain particle size. While the Hoechst patent teaches shearing the polymer, it does not disclose shearing the syrup as required in the present invention. Additionally, the rubber used in the Hoechst process is EPDM which is not used in the present invention.

U.S. Pat. No. 5,210,132 assigned to the Mitsui Toatsu Chemicals, Inc. issued May 11, 1993 discloses a process which forms a dispersed rubber-like composite phase in a continuous resin phase. The particulated syrup is then subjected to shear in a device having at least three shearing blades or rotors. The shearing rotors and stators are coaxial and have comb like cuts at interposing ends or sections to form a multilayer structure. The result is that the Mitsui patent teaches shearing a particulated syrup using a multizone shear field having at least three different shear rates. It is an essential feature of the Mitsui patent that the syrup be particulated prior to subjecting it to shear. The Mitsui patent teaches against the subject matter of the present invention in that the present invention relates to the departiculation of a stable particulated syrup to a post inversion metastable syrup and particulating the said post inversion metastable syrup to a stable state. A number of essential features of the Mitsui patent teaches away from the subject matter of the present invention.

None of the above art suggests a process to form a post inversion metastable syrup from a stable particulated one. Metastable syrups have been studied from an academic perspective. In Rubber-Toughened Plastics, edited by C. Keith Riew, published by The American Chemical Society in 1989, on page 25 of a review article, mentions some earlier work in which bulk ABS was produced under high shear and reagglomeration was noted.

Accordingly, the present invention seeks to provide for the industrial production of a post inversion metastable syrup consisting of co-continuous resin and rubber-like composite phases to provide additional degrees of freedom to control or manipulate the particle size distribution in impact modified thermoplastics.

As used in this specification the following terms have the following meanings:

"Dispersion" means a system of two or more phases in which one phase forms a continuous phase and the other phases are dispersed as small droplets or particles through the continuous phase;

"Resin phase" means a solution of polymer resin dissolved in one or more monomers or the polymer itself;

"Rubber phase" means an uncrosslinked rubber dissolved in one or more. monomers, or the rubber itself;

"Rubber-like composite phase" means a composite of a rubber phase as defined above and one or more resin phases as defined above said composite may contain resin polymers occluded by or grafted onto the rubber polymers;

"Dispersed rubber-like composite phase" means a rubber-like composite phase dispersed throughout a continuous resin phase;

"Post inversion metastable syrup" or "metastable syrup" means a syrup polymerized under low shear conditions past the normal phase inversion region described earlier for batch processes and plug flow reactors and consists of a rubber-like composite phase that is continuous or co-continuous with resin phase in a metastable free energy state [e.g. Gibbs or Helmholtz]. Post inversion metastable syrups may also be generated by departiculation or reverse inversion of particulated stable syrups;

"Particulation" a term used to describe the formation of a dispersed rubber-like composite phase regardless of its mechanism;

"Dispersing" or "phase dispersion" or "particulation by dispersion" means the formation of a dispersed rubber-like composite phase in a continuous resin phase by dispersing with mechanical agitation a rubber phase or continuous rubber-like composite phase into a tank which has a continuous resin phase. Typically, this process occurs in a continuous stirred tank reactor (CSTR);

"Inverting", or "inversion", or "phase inversion" or "particulation by inversion" means the formation of a dispersed rubber-like composite phase in a continuous resin phase from a syrup which has a continuous or co-continuous rubber-like composite phase;

"Rapid phase inversion" or "step like phase inversion" (as opposed to "inverting", or "inversion", "phase inversion", or "particulation by inversion") means the particulation of a post inversion metastable syrup in a relatively short time or small reactor volume to a stable syrup consisting of a dispersed rubber-like composite phase and a continuous resin phase;

"Departiculation" or "Reverse Inversion" means subjecting a stable syrup consisting of a dispersed rubber-like composite phase and a continuous resin phase, to conditions which causes the dispersed rubber-like composite phase and the continuous resin phase to become co-continuous. The resulting syrup is in a post inversion metastable state; and "Low shear" means a shear field which is not sufficient to invert a metastable syrup. Low shear fields occur in static mixer reactors or during mechanical agitation of anchor or turbine agitators or other agitators operated at low rates of rotation. Typically with driven agitators the rates of rotations are less than 15, preferably less than 10 RPM's most preferably as low as possible. Of course one skilled in the art will be aware that the degree of agitation will depend on reactor configuration and appropriate speeds can be determined by routine experimentation after reading this specification.

SUMMARY OF THE INVENTION

According to the broadest aspect of the present invention there is provided a process comprising subjecting at least a portion of a stable syrup comprising a continuous resin phase and a discontinuous rubber-like composite phase to high shear and pressure to form a metastable syrup comprising a continuous or co-continuous rubber-like composite like phase and a discontinuous or co-continuous resin phase, respectively.

A further embodiment of the present invention provides, a process for the production of a stable syrup comprising a continuous resin phase and a dispersed rubber-like composite phase and exposing said stable syrup to a controlled high shear and pressure field to produce a post inversion metastable syrup consisting of co-continuous resin and rubber-like composite phases and further exposing said metastable syrup to a lower controlled relatively uniform shear field to particulate it to a stable state. This process provides additional degrees of freedom to control or manipulate the particle size distribution in impact modified thermoplastics.

There are a number of advantages of the process of the present invention. The invention permits a high degree of control over the particle size, narrowing of the particle size distribution and the process is easily modified by stream splitting and the application of multiple uniform shear field generating devices to produce bi- or multimodal particle size distributions all of which will lead to a better or better balance of properties.

DETAILED DESCRIPTION

Figure 1:
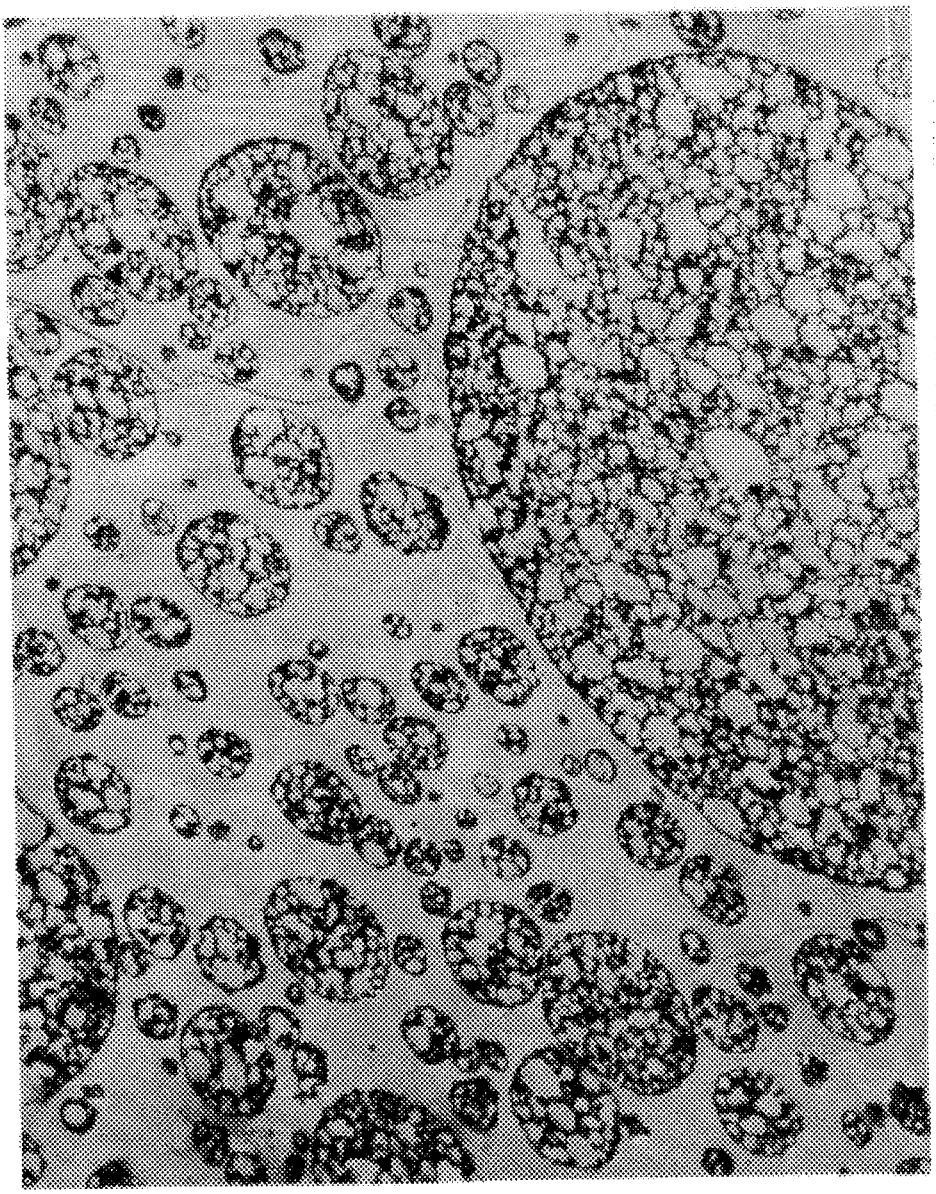
FIG. 1 is a transmission electron micrograph (7,500 X) of an advanced and devolatilized stable particulated syrup obtained from the stirred tank reactor of example 2 at 32.90% solids, prior to departiculation under shear and pressure.

The process of the present invention is extremely broad in its application. For example the at least a portion of the syrup could comprise the entire syrup. The resulting departiculated metastable syrup could then be divided into two or more streams each of which are further separately treated to form different particle size distributions which are further recombined to form a bi- or multimodal dispersed rubber-like composite phase. On the other hand the stable particulated syrup could be divided into two or more portions each of which are separately subjected to a controlled high shear and pressure to cause departiculation. The resulting post inversion metastable syrups may then be separately further treated to form different particle size distributions and are further combined to form a bi- or multimodal dispersed rubber-like composite phase.

The syrups which may be treated in accordance with the present invention typically are syrups which would be polymerized to form impact modified polymers including high impact polystyrene (HIPS), acrylonitrile butadiene styrene polymers (ABS) and methyl methacrylate butadiene styrene polymers (MBS).

The monomers useful in the syrups which may be treated in accordance with the present invention may be selected from the group consisting of $C_{8-12}$ vinyl aromatic monomers which are unsubstituted or substituted by a $C_{1-4}$ alkyl radical, $C_{1-8}$ alkyl esters of acrylic or methacrylic acids, maleic anhydride, and acrylonitrile and methacrylonitrile.

Suitable $C_{8-12}$ vinyl aromatic monomers which are unsubstituted or substituted by a $C_{1-4}$ alkyl radical include styrene, α-methyl styrene, p-methyl styrene, and p-t-butyl styrene. Useful $C_{1-8}$ alkyl esters of acrylic and methacrylic acids include methyl methacrylate, ethyl methacrylate, methyl acrylate, ethyl acrylate, and ethylhexyl acrylate.

The resin component in the syrup may comprise a co- or homo-polymer or resin of one or more $C_{8-12}$ vinyl aromatic monomers which are unsubstituted or substituted by a $C_{1-4}$ alkyl radical. A suitable resin includes polystyrene. However, the resin may be a copolymer comprising from 5 to 95, preferably from 50 to 90 weight % of one or more $C_{8-12}$ vinyl aromatic monomers and from 95 to 5, preferably from 50 to 10 weight % of one or more monomers selected from the group consisting of $C_{1-8}$ alkyl esters of acrylic and methacrylic acids, maleic anhydride and acrylonitrile and methacrylonitrile. Typically such polymers are copolymers of styrene and one or more monomers selected from the group consisting of acrylonitrile, methacrylonitrile, methyl acrylate, ethyl acrylate, methyl methacrylate, ethyl methacrylate, butyl acrylate, butyl methacrylate, ethylhexyl acrylate, and maleic anhydride.

When finally finished the resin polymers should have a number average molecular weight (Mn) greater than 65,000 preferably greater than 70,000 for the styrene containing polymers and a number average molecular weight of greater than 30,000 for the predominantly ester polymers.

The rubbers which may be used as impact modifiers in the present invention will typically have a (weight average) molecular weight (Mw) of greater than about 100,000, preferably greater than 200,000. Block rubber copolymers have significantly lower molecular weight, typically greater than 50,000 (Mw). The rubbers may be selected from the group consisting of:

(i) co- or homopolymers of $C_{4-6}$ conjugated diolefins which are unsubstituted or substituted by a halogen atom, preferably a chlorine or bromine atom;

(ii) random, block, linear, star and tapered copolymers comprising from 10 to 80 weight % of one or more $C_{8-12}$ vinyl aromatic monomers which are unsubstituted or substituted by a $C_{1-4}$ alkyl radical, from 20 to 90 weight % of one or more $C_{4-6}$ conjugated diolefins; and (iii) copolymers comprising from 1 to 50 weight % of acrylonitrile or methacrylonitrile and from 50 to 99 weight % of one or more $C_{4-6}$ conjugated diolefins.

Suitable polymers which are co or homopolymers of $C_{4-6}$ conjugated diolefins include homopolymers of butadiene and copolymers of butadiene and isoprene. Preferably the polymer will be a homopolymer of butadiene. Generally the polymers have a level of stereospecificity. The selection of the degree of stereospecificity will depend to some extent upon the properties required in the final product. Some polybutadienes contain over 90, most preferably over 95 weight % of monomer in the cis configuration. Such a type of rubber is commercially available from Polysar Rubber Corporation under the trademark TAKTENE® 1202. The polybutadiene may contain a lower amount, typically from 50 to 65, most preferably about 50 to 60 weight % of monomer in the cis configuration such as rubbers which are available from Firestone under the trademark DIENE®55 or from the Polysar Rubber Corporation under the trademark TAKTENE® 550.

Suitable rubbery polymers may comprise: from 10 to 80, preferably from 20 to 50 weight % of one or more $C_{8-12}$ vinyl aromatic monomers which are unsubstituted or substituted by a $C_{1-4}$ alkyl radical, from 20 to 90, preferably from 80 to 50, weight % of one or more $C_{4-6}$ conjugated diolefins. Such rubber polymers may be random or block such as linear block, star block or tapered block polymers.

Random copolymers having the above composition are the commercially available styrene butadiene rubbers (SBR). A number of block copolymers are available from Shell under the trademark KRATON®.

The rubbery polymer may comprise from 1 to 50, preferably from 5 to 35 weight % of acrylonitrile or methacrylonitrile and from 50 to 99, preferably from 95 to 65 weight % of one or more $C_{4-6}$ conjugated diolefins.

The above polymers are the commercially available nitrile rubbers available from Polysar Rubber Corporation under the trademark KRYNAC® and from Bayer AG under the trademark PERBUNAN®.

It should be kept in mind that the rubber should be soluble in one or more of the monomers of the syrup or the diluent or solvent for the monomers. The solubility of the above rubbers in various monomers and/or diluents or solvents may be easily determined by non-inventive routine testing.

Typically, from about 1 to 20, preferably from about 3 to 12, most preferably from 4 to 10 weight % of the rubber is dissolved in the monomer or a mixture of monomers to form a syrup.

In a typical batch or plug flow reactor system the syrup is subjected to usual polymerization process under agitation. At some point between 5 and 20% conversion the system undergoes particulation by phase inversion under the application of a shear field generated by mechanical agitation. That is the rubber-like composite phase becomes the dispersed phase and the resin phase becomes the continuous phase. This does not happen instantaneously but occurs over a considerable period of time or space, typically from 20 to 50 minutes or reactor space which produces 2 to 8% conversion. As a result there tends to be a particle size distribution within the inverted syrup. In accordance with the present invention it is possible to departiculate such a syrup to a metastable state and in a further embodiment in a separate step particulate the metastable syrup in a rapid or step-like phase inversion.

In a preferred embodiment of the present invention the initial syrup is polymerized in a batch or plug flow process either thermally or in the presence of one or more initiators. Typical polymerization temperatures (in the reactors) range from 80 to 180, more typically 90° to 170° C. Under these conditions the syrup undergoes phase inversion. The resulting particulated syrup is then treated in accordance with the present invention to produce a post inversion metastable syrup. In accordance with this aspect of the invention, the particulated syrup is polymerized to a conversion between 1% above the point at which the syrup has inverted and the point at which the rubber has become crosslinked to form a network. Preferably the degree of conversion is between 5 and 75% before the syrup is treated in accordance with the present invention.

In a particularly preferred embodiment the post inversion metastable syrup may be handled using low shear methods such as low shear pumps, gravity feeds or vacuum and pressure techniques.

A reactor or a chain of reactors such as a plug flow reactor may be used to produce such a syrup. Upon inversion or dispersion the rubber-like composite phase will be distributed throughout the continuous resin phase. The plug flow reactors should have a length to diameter ratio of greater than about 3:1, preferably from about 5:1 to 15:1, most preferably about 9:1. The reactors may contain an agitator to provide for movement of the syrup for heat transfer requirements.

Another way of producing a particulated syrup is to feed a rubber solution or partially polymerized syrup below its inversion point to a continuous stirred tank reactor (CSTR) operated at an equilibrium conversion sufficiently high so that the said rubber solution or rubber-like composite phase is dispersed as discrete particles in a continuous resin phase. The resulting syrup may then be treated in accordance with the present invention.

If a stable particulated syrup having a dispersed rubber-like composite phase is subjected to high shear preferably under pressure greater than about 200 psi, prior to the rubber phase becoming crosslinked it will departiculate to a post inversion metastable syrup in which the rubber-like composite phase is co-continuous with the resin phase.

One way to generate a post inversion metastable syrup is to pump a stable particulated syrup through a restricted orifice using a gear pump. The pressure should be greater than 200 psi, preferably between 250 to 500 psi.

The shear/pressure requirements for the departiculation of a stable particulated syrup will depend on a number of factors including the type and configuration of equipment used, the degree of polymerization of the syrup and the viscosity of the syrup. While it is difficult to scale up from laboratory equipment to plant scale equipment the relative magnitudes of the shear on each side of the crossover point may be examined using a device capable of delivering high shear and pressure. Syrup samples may be placed in such a device and each subjected to different shear rates and pressures. The resulting sample is then polymerized in a glass tube to completion and the product can be analyzed by the Test for Particulation and Transmission Electron Microscopy described in the Specific Embodiments. By observing the morphology of the sample and correlating it to shear rate and pressure, it is possible to define the conditions where the syrup will undergo departiculation (forming a post inversion metastable syrup in which the rubber phase is continuous or co-continuous with the resin phase). Generally the shear rates and pressure to cause a stable syrup to departiculate to a post inversion metastable syrup are quite high.

It is also believed that a stable particulated syrup may be departiculated by pumping under pressure through a controlled shear device consisting of a stator and a rotor, which is described in detail in copending U.S. application Ser. No. 094,309, filed Jul. 19, 1993.

A useful indication of particle size is reflected by the volume average particle diameter. The volume average particle diameter is given by the ratio of the fourth moment of the particle size distribution to the third moment of the particle size distribution.

$$\text{Volume Average diameter} = \frac{\Sigma n_i d_i^4}{\Sigma n_i d_i^3}$$

wherein $n_i$ is the number of all particles having diameter $d_i$ summed over all particles.

Often, but not invariably, the dispersed particles have a log normal distribution and the particle size density distribution is given by:

$$p(x) = \frac{1}{\sqrt{2\pi}\ \sigma x} \exp\left(-0.5\left(\frac{\ln x - \mu}{\sigma}\right)^2\right)$$

where p(x) is the particle density at diameter x, μ is a parameter indicating the location of the distribution, and σ is a parameter indicating the spread or breadth of the distribution. In cases where the particle size distribution is log normal these two parameters, μ and σ, uniquely determine the distribution. A typical particle size distribution may be characterized as a particle size distribution having a volume average particle diameter from 0.1 to 30, preferably from 0.5 to 10, most preferably from 0.5 to 5, micrometers. Preferably for high impact polystyrene type systems the volume average particle diameter will be from 0.5 to 15 micrometers. Preferably for the ABS, MBS and the ester (e.g. acrylate and methacrylate) resin type systems the volume average particle diameter will be from 0.05 to 5 micrometers. As noted above there are a number of bi- and polymodal particle size distributions which give useful properties. Generally useful bi- or poly-modal particle size distribution comprises from 100 to about 40% of small particles from about 0 to about 60% of medium sized particles and from 0 to 20 weight % of particles outside the specified sizes for small and medium particles. The ratio of diameters of small to medium particles may range from 1:1.15 to 1:20 preferably from 1:1.3 to 1:6.

Useful uniform shear devices are described in the above noted patent application.

The device may comprise a stator and a rotor, most preferably with an adjustable gap there between, and a controlled or determined path length through which the syrup must flow.

The device may comprise a tubular stator member, such as a straight or tapered pipe. Inside the tubular member is a closed cylinder or cone which is the rotor. Preferably the rotor is movable within the stator to control either or both the clearance between the rotor and stator and the path length over which the fluid is subjected to shear. More particularly the device may be a Couette fluid shear field generator comprising:

(i) a chamber having a circular cross section perpendicular to its longitudinal axis and at least one input port and at least one output port;
(ii) a cylinder within said chamber, said cylinder having a circular cross section perpendicular to its longitudinal axis, a surface closely conforming to the internal surface of said chamber and occupying substantially all the space within said chamber except for a closely controlled clearance between the internal surface of the chamber and the external surface of the cylinder; and
(iii) means for rotating at least one of said chamber and cylinder relative to each other.

Preferably the cylinder is a rotor and the chamber is closed and a stator. Preferably a drive means passes through one end of said chamber and to rotate the cylinder relative to the chamber.

The internal shape of the chamber and the external shape of the rotor conform. Suitable shapes for the chamber and rotor include cylindrical, frustroconical (tapered cylindrical), and conical. Spherical, hemi-spherical and parabolic shapes would likely be useful but may be more difficult to use in plant operations. A special shape would be a plate shaped stator or chamber and a plate shaped rotor. A further special configuration is a plate shaped stator with a conical shaped rotor or conical stator with plate shaped rotor.

Suitable ratios of dimensions for the shear field generator will depend upon the required residence time, the diameter of the rotor and the chamber and the speed of rotation. Clearance between the chamber wall and the surface of the rotor for a cylindrical chamber and rotor may be defined in terms of the ratio of the radius of the rotor (rr) to the radius of the chamber (rc). Typical ratios range from 0.999 to 0.750, preferably from 0.993 to 0.875. The ratio of the length to the diameter of the chamber (L/D ratio) should be greater than 0.25:1, preferably between 0.5:1 to 10:1 and most preferably between 0.5:1 to 3:1. The input and output ports should be preferably located at each end of the chamber.

A relatively uniform controlled shear field may also be provided by flowing said syrup through a device comprising a closed chamber having a circular cross section perpendicular to its longitudinal axis, a continuous side wall and a conical projection along its longitudinal axis, said conical projection having a low apical angle, a planar end perpendicular to the longitudinal axis of said chamber and placed adjacent the apex of said conical projection and means for rotating said conical projection and said plate relative to each other. The apical angle is less than, 7 preferably less than 4, most preferably less than 2°. The gap between the tip of the cone and the plate should be minimal.

The free volume within the device should be less than 10%, preferably less than 5%, most preferably less than 3% of the volume of the reactors upstream of the device. As a result residence time of the syrup as it flows through the device should be low. Typically the residence time should be less than 10 minutes, preferably less than 5 minutes most preferably less than 3 minutes. Of course, the residence time will depend on the free volume within the chamber and the flow rate through the controlled shear (field) device. Typically the conversion of the monomers will be less than 5%, preferably less than 2%, most preferably less than 1% within the controlled shear field device.

EXAMPLES

The present invention will be illustrated by the following examples which are not intended to limit the invention. In the examples, unless otherwise indicated parts means parts by weight and % means weight %.

Continuous Stirred Tank Reactor (CSTR)

The CSTR was a glass 1.0 L vessel equipped with a bottom outlet port. The reactor has a external heating jacket with ports to flow hot oil through and was connected to a heating circulating oil bath to provide temperature control. The top of the reactor was removable and equipped for mechanical agitation. A drive shaft passed through a seal in the top of the reactor. One end of the drive shaft was attachable to an electric motor and the other end was attachable to an agitator. Batch (syrup) temperature was measured in the middle of the reactor and recorded The temperature in all transfer lines were controlled.

Polymerization Apparatus (Type I)

One liter of feed solution was fed from the dissolving tank to a gear pump which delivered it to the stirred tank reactor.

The polymerization was operated in batch mode and was sampled for solids content. When the desired solids content was reached the bottom outlet valve was opened and the syrup was pumped through a gear pump. The gear pump was operated at various RPM's under low and high pressure. Pressure was generated by partially closing a valve that was downstream from the gear pump. The gear pump was capable of generating 750 psi and was protected by a pressure relief valve, which opened at about 350 psi.

Polymerization Apparatus (Type II)

Feed solution was fed from the dissolving tank to a gear pump which delivered it to the continuous stirred tank reactor. The syrup exited the reactor through the bottom outlet port using a three way valve. Level control was maintained by manually adjusting the three way valve. When equilibrium solids were achieved the feed pump was turned off, the three way bottom outlet valve was switched and the syrup was pumped through a gear pump. The gear pump was operated at various RPM's under low and high pressure. Pressure was generated by partially closing a valve that was downstream from the gear pump. The gear pump was capable of generating 750 psi and was protected by a pressure relief valve, which opened at about 350 psi.

Polymerizations

Using one of the above apparatuses a series of experiments were carried out. Styrene containing 8 weight % of a medium cis rubber was polymerized by thermal or 0.028% t-butylperoxyacetate initiation under mechanical agitation. Samples of the resulting syrup were taken from the reactor and after treatment in the gear pump. The syrup samples were advanced at 140° C. for 24 hours and then devolatilized at 220° C. for 30 minutes in a vacuum oven under reduced pressure (~5 mm Hg). The resulting samples of rubber modified polystyrene then subjected to analysis.

Test For Particulation

Three tenths of a gram of a devolatilized HIPS resin is shaken in 15 mL of 2-butanone (MEK) and inspected for visible gel particles. A well particulated HIPS resin will appear as a milk like suspension, while a non-particulated HIPS resin (one with a co- or continuous rubber phase) will appear as a single gel particle in a clear solution. "Partially particulated" HIPS resins are ones that fall between these two extremes.

Measurement of Swelling Index and Gel Content

Approximately one gram of polymer is accurately weighed and dissolved in 40 mL of toluene and centrifuged at 17,000 RPM, at −7° C., for two hours. The supernatant liquid is decanted, 40 mL of fresh toluene is added to the precipitated gel, and the mixture treated in an ultrasonic bath for two hours. The sample is then centrifuged at 17,000 RPM and −7° C. for two hours. The supernatant liquid is decanted. The wet gel is weighed and then dried and weighed again. The swelling index is calculated by dividing the wet gel weight by the dry gel weight, and the gel level is calculated by dividing the dry gel level by the initial sample weight.

Particle Size Measurement

An Horiba photosedimentometer was used for particle size analysis. A typical procedure involves dispersing enough HIPS resin such that the starting absorbency of the instrument lies between 0.75 and 0.85 in 10 mL of MEK. The sample is inspected for complete dispersion and is measured immediately in centrifugal mode. The machine reports area median. The output was fitted to a log normal distribution, where appropriate, to calculate the appropriate values for the characterization of the particle size distribution.

Transmission Electron Microscopy (TEM)

TEM's were taken of selected samples using routine methods.

Syrup Solids

Syrup solids were determined using gravimetric analysis by devolatilizing the sample at high temperature (220° C.) and reduced pressure (5 mm Hg).

EXAMPLE 1

The feed syrup comprised 8% medium cis polybutadiene and 0.028% t-butylperoxyacetate in styrene. The polymerization was operated in batch mode using the type I apparatus. A turbine agitator was operated at 60 RPM. When the syrup solids reached about 27.5% it was discharged through the gear pump at different shear rages (e.g. RPM) under pressure. A syrup sample taken from the reactor prior to the gear pump was advanced, devolatilized and found to be particulated; volume average diameter=2.48 μM. The remaining samples were discharged through the gear pump under shear and pressure. The other samples were tested for departiculation (the absence of particles) using the test for particulation.

The results of the experiment are set forth in Table I.

TABLE I

| RESULTS OF EXAMPLE I | |
|---|---|
| Gear Pump RPM | Test for Particulation |
| 4 | Gel and Turbidity |
| 30 | Gel and Turbidity |
| 60 | Gel and Turbidity |
| 90 | Gel, Little Turbidity |
| 110 | Gel, Little Turbidity |

The "gel" from the particulation test shows departiculation and the declining turbidity shows increasing departiculation (e.g. less particles) with increasing shear (and likely pressure).

EXAMPLE 2

The feed syrup comprised 8% media cis polybutadiene and 0.028% t-butylperoxyacetate in styrene. The polymerization was operated in batch mode using the Type I apparatus. A turbine agitator was operated at 60 RPM. When the syrup solids reached about 30% it was discharged through the gear pump under low (up to at most 30 psi) and high pressure (above 200 psi) at different shear rates (gear pump RPM). A syrup sample taken from the reactor before the gear pump was advanced, devolatilized and found to be particulated; volume average diameter=2.62 μM. The other samples were tested for departiculation (the absence of particles) using the test for particulation.

The results of the experiment are set forth in Table II.

TABLE II

| RESULTS OF EXAMPLE 2 | | |
|---|---|---|
| Gear Pump RPM | Pressure | Test for Particulation |
| 10 | Low | Particulated, Volume Average Diameter = 2.34 μM |
| 10 | High | Gel and Turbidity |
| 45 | High | Gel, Little Turbidity |
| 90 | High | Gel, Little Turbidity |

The "gel" from the particulation test shows departiculation and the declining turbidity shows increasing departiculation (e.g. less particles) with increasing shear (and likely pressure).

The above example shows under the conditions tested both high pressure and shear are needed to change a stable particulated syrup into a post inversion metastable syrup.

The post inversion metastable syrups obtained from the gear pump under high shear and pressure were then treated to a lower controlled shear field for 2 minutes at 115° C., in batch mode (shear rate=6.8 sec$^{-1}$).

The results of the treatment are set forth in Table III.

TABLE III

PARTICULATION OF POST INVERSION METASTABLE SYRUPS

| Metastable Syrup Sample | Particulated After Treatment | Volume Average Diameter (μM) |
|---|---|---|
| Gear Pump = 10 RPM | Yes | 2.28 |
| Gear Pump = 45 RPM | Yes | 1.80 |
| Gear Pump = 90 RPM | Yes | 1.60 |

The above example shows it is possible to convert a stable particulated syrup to a post inversion metastable syrup and further to convert the post inversion metastable syrup back to a stable particulated syrup with a different particle size.

FIG. 1 is an electron micrograph (7,500 X) of the sample of syrup taken from the reactor prior to the gear pump and advanced to completion and devolatilized. The figure clearly shows a large particle size particulated syrup.

Figure 2:
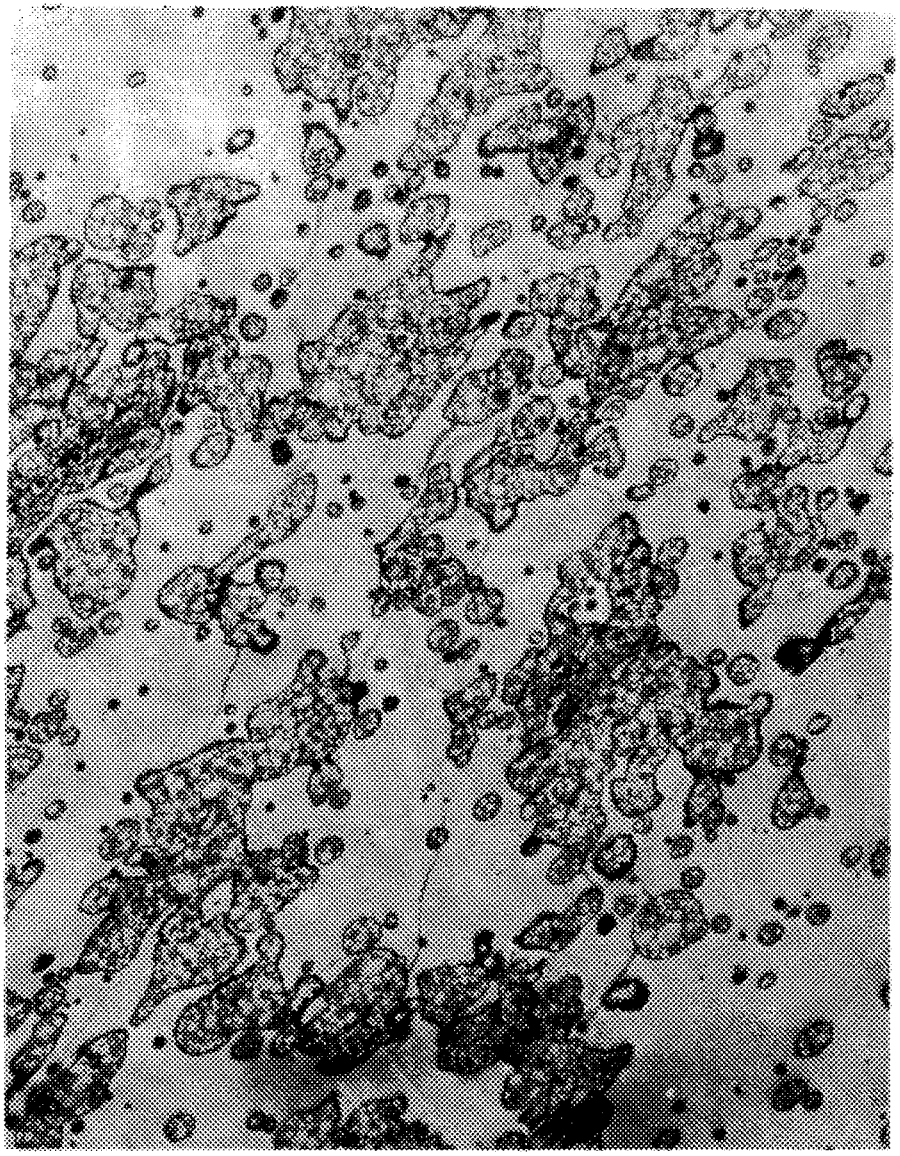
FIG. 2 is a transmission electron micrograph (7,500 X) of an advanced and devolatilized post inversion metastable syrup in which the rubber-like composite and resin phases are co-continuous. The post inversion metastable syrup was prepared from the stable particulated syrup shown in FIG. 1 by flowing it through a gear pump at 90 RPM with a restricted discharge port at 32.88% solids. This inputed high shear and pressure into the stable particulated syrup and caused it to departiculate to a metastable state.

FIG. 2 is an electron micrograph (7,500 X) of a sample of syrup which had passed through the gear pump at 90 RPM and under high pressure. The sample was then advanced and devolatilized. The figure shows a co-continuous resin and rubber-like.

Figure 3:
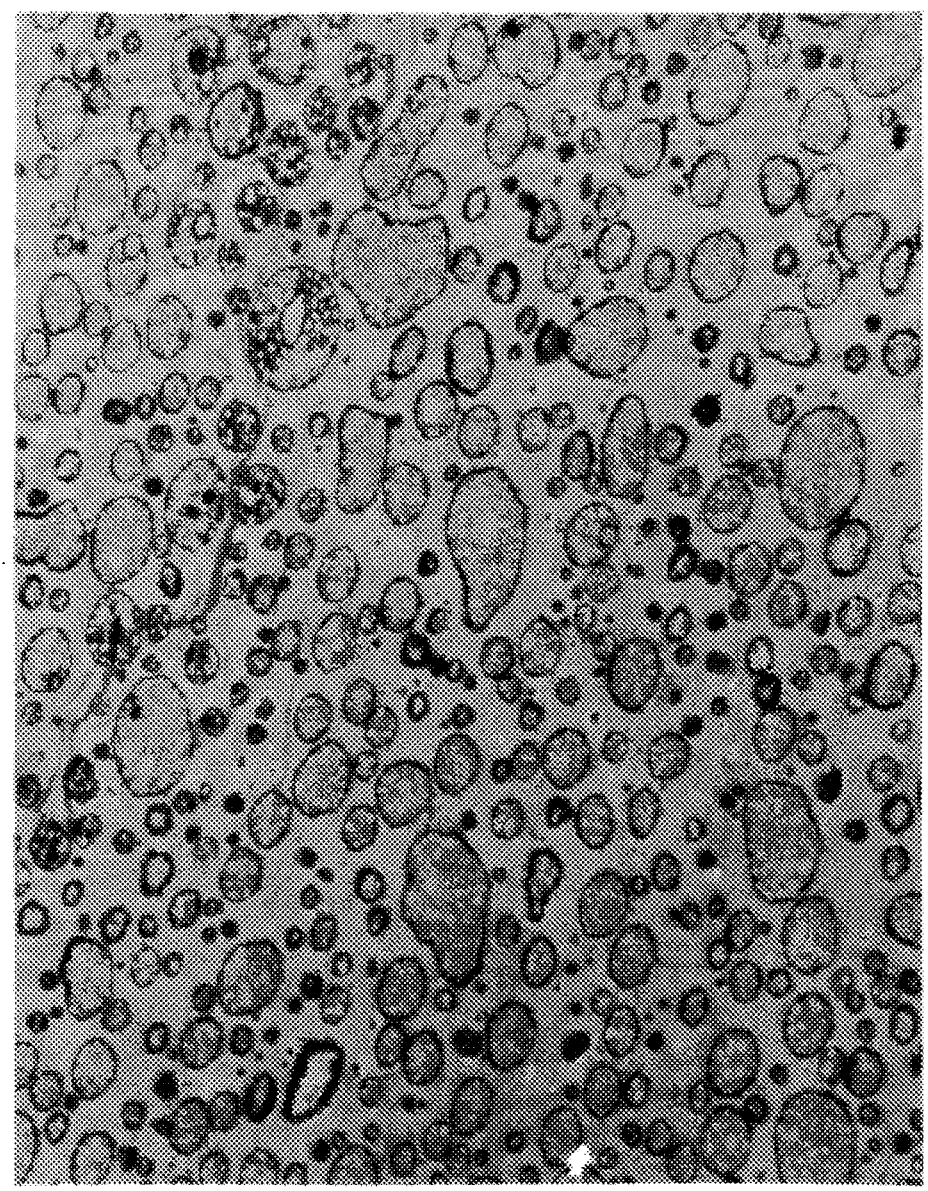
FIG. 3 is a transmission electron micrograph (7500 X) of an advanced and devolatilized stable particulated syrup that was prepared from the metastable syrup shown in FIG. 2 by the application of a uniform shear field, which caused a rapid or step-like phase inversion.

FIG. 3 is an electron micrograph (7,500 X) of a sample of the syrup passed through the gear pump at 90 RPM and under high pressure and treated in a uniform shear field. The sample was advanced and devolatilized. The figure shows a relatively smaller particle size distribution than that in FIG. 1.

EXAMPLE 3

The feed syrup comprised 8% medium cis polybutadiene in styrene. The polymerization was operated in batch mode using the type I apparatus and was thermally initiated. A turbine agitator was operated at 60 RPM. When the syrup solids reached about 43% it was discharged through the gear pump at different shear rates (e.g. RPM) under low and high pressure. A syrup sample taken from the reactor prior to the gear pump was advanced, devolatilized and found to be particulated; volume average diameter=1.94 μM. The other samples were tested for departiculation (the absence of particles) using the test for particulation.

The results of the experiment are set forth in Table IV.

TABLE IV

RESULTS OF EXAMPLE 3

| Gear Pump RPM | Pressure | Test for Particulation |
|---|---|---|
| 10 | Low | Particulated, Volume Average Diameter = 1.99 μM |
| 10 | High | Gel and Turbidity |
| 45 | High | Gel and Turbidity |
| 90 | High | Gel and Turbidity |

The "gel" from the particulation test shows departiculation and the declining turbidity shows increasing departiculation (e.g. less particles) with increasing shear (and likely pressure).

EXAMPLE 4

The feed syrup comprised 8% medium cis polybutadiene and 0.028% t-butylperoxyacetate in styrene. The polymerization was operated in continuous mode using the type II apparatus. The feed solution was fed at 435 mL/hr. A turbine agitator was operated at 100 RPM. When the equilibrium syrup solids of 27% was reached the feed pump was turned off, the bottom outlet three way valve was switched and the syrup was discharged through the gear pump under different shear (e.g. RPM) and under low (less than 30 psi) and high pressure (greater than 200 psi). A syrup sample from the reactor before the gear pump was advanced, devolatilized and found to be particulated; volume average diameter=2.60 μM. The other samples were tested for departiculation (the absence of particles) using the test for particulation.

The results of the experiment are set forth in Table V.

TABLE V

RESULTS OF EXAMPLE 4

| Gear Pump RPM | Pressure | Test for Particulation |
|---|---|---|
| 10 | Low | Particulated, Volume Average Diameter = 2.89 μM |
| 10 | High | Gel and Turbidity |
| 45 | High | Gel and Turbidity |
| 90 | High | Gel and Turbidity |

The "gel" from the particulation test shows departiculation and the declining turbidity shows increasing departiculation (e.g. less particles) with increasing shear (and likely pressure).

EXAMPLE 5

The feed syrup comprised 8% medium cis polybutadiene and 0.028% t-butylperoxyacetate in styrene. The polymerization was operated in continuous mode using the type II apparatus. The feed solution was fed at 435 mL/hr. A turbine agitator was operated at 60 RPM. When the equilibrium syrup solids of 28% was reached the feed pump was turned off, the bottom outlet three way valve was switched and the syrup was discharged through the gear pump under low and high pressure. A syrup sample from the reactor before the gear pump was advanced, devolatilized and found to be particulated; volume average diameter=2.52 μM. The other samples were tested for departiculation (the absence of particles) using the test for particulation.

The results of the experiment are set forth in Table VI.

TABLE VI

RESULTS OF EXAMPLE 5

| Gear Pump RPM | Pressure | Test for Particulation |
|---|---|---|
| 10 | Low | Particulated, Volume Average Diameter = 2.59 μM |
| 10 | High | Gel and Turbidity |
| 45 | High | Gel, Little Turbidity |
| 90 | High | Gel, Little Turbidity |

The "gel" from the particulation test shows departiculation and the declining turbidity shows increasing departiculation (e.g. less particles) with increasing shear (and likely pressure).

The above examples show it is possible to departiculate stable particulated syrups formed in batch or continuous polymerizations with thermal or t-butylperoxyacetate initiation to post inversion metastable syrups.

What is claimed is:

1. A process comprising subjecting at least a portion of a stable syrup comprising from 99 to 80 weight % of a continuous resin phase comprising one or more monomers selected from the group consisting of $C_{8-12}$ vinyl aromatic monomers which are unsubstituted or substituted by a $C_{1-4}$ alkyl radical; $C_{1-8}$ alkyl esters of acrylic acid or methacrylic acid, maleic anhydride, acrylonitrile and methacrylonitrile; and from 1 to 20 weight % of an uncrosslinked discontinuous rubber-like composite phase wherein the rubber is selected from the group consisting of:

(i) co- or homopolymers of $C_{4-6}$ conjugated diolefins;

(ii) random, block and tapered copolymers comprising from 10 to 80 weight % of one or more $C_{8-12}$ vinyl aromatic monomers which are unsubstituted or substituted by a $C_{1-4}$ alkyl radical and from 20 to 90 weight % of one or more $C_{4-6}$ conjugated diolefins; and (iii) copolymers comprising from 20 to 50 weight % of one or more of acrylonitrile and methacrylonitrile and from 50 to 80 weight % of one or more $C_{4-6}$ conjugated diolefins, to a pressure of greater than 200 psi and a high shear rate to cause said discontinuous rubber-like phase in said portion of said stable syrup to become a co-continuous phase.

2. The process according to claim 1, wherein said syrup comprises from 1 to 20 weight % of rubber.

3. The process according to claim 2, wherein said syrup comprises from 4 to 10 weight % of rubber.

4. The process according to claim 3, wherein said syrup has been polymerized to a conversion from 4 to 75%.

5. The process according to claim 4, wherein said shear input is provided using a gear pump at pressures greater than 200 psi.

6. The process according to claim 5, wherein said shear input is provided using a gear pump at a pressure from 250 to 500 psi.

7. The process according to claim 4, wherein the pressure is greater than 200 psi and said shear is provided using a device comprising:

(i) a closed chamber having a symmetrical continuous smooth internal surface about its longitudinal axis and at least one input port and at least one output port;

(ii) a cylinder within said chamber, said cylinder having a symmetrical smooth surface about its longitudinal axis, said surface closely conforming to the internal surface of said chamber; said cylinder occupying substantially all the space within said chamber except for a closely controlled clearance between the internal surface of the chamber and the external surface of the cylinder; and (iii) means for rotating at least one of said chamber and cylinder relative to each other.

8. The process according to claim 7, wherein in said device the ratio of the radius of the rotor to the radius of the chamber is from 0.999 to 0.750.

9. The process according to claim 4, wherein the pressure is greater than 200 psi and said shear is provided using a device comprising:

(i) a closed chamber having at least one input and at least one output port, a circular cross section perpendicular to its longitudinal axis, a continuous side wall at least one end plate perpendicular to said longitudinal axis;

(ii) a cone having a low apical angle projecting into said chamber and along its longitudinal axis, the apex of said cone being adjacent the centre point of said end plate; and (iii) means for rotating at least one of said cone and said end plate relative to each other.

10. The process according to claim 9, wherein in said device the apical angle of said cone is less than 4°.

* * * * *